Nov. 29, 1966  R. B. NELSON  3,289,109
HIGH FREQUENCY WAVEGUIDE WATERLOAD FOR ELECTROMAGNETIC
WAVE ENERGY WITH FLOW CHANNEL HAVING
WEDGE SHAPED INTERNAL GEOMETRY
Filed July 23, 1965  2 Sheets-Sheet 1

INVENTOR.
RICHARD B. NELSON
BY
ATTORNEY

Nov. 29, 1966    R. B. NELSON    3,289,109
HIGH FREQUENCY WAVEGUIDE WATERLOAD FOR ELECTROMAGNETIC
WAVE ENERGY WITH FLOW CHANNEL HAVING
WEDGE SHAPED INTERNAL GEOMETRY
Filed July 23, 1965    2 Sheets-Sheet 2

INVENTOR.
RICHARD B. NELSON
BY
ATTORNEY

United States Patent Office 3,289,109
Patented Nov. 29, 1966

3,289,109
HIGH FREQUENCY WAVEGUIDE WATERLOAD FOR ELECTROMAGNETIC WAVE ENERGY WITH FLOW CHANNEL HAVING WEDGE SHAPED INTERNAL GEOMETRY
Richard B. Nelson, Los Altos, Calif., assignor to Varian Associates, Palo Alto, Calif., a corporation of California
Filed July 23, 1965, Ser. No. 474,303
19 Claims. (Cl. 333—22)

This invention relates in general to a novel high power, high frequency (particularly microwave spectrum) broadband waveguide waterload and more particularly to such a waterload incorporating a broadbanded electromagnetic wave permeable dielectric block window vacuum sealed within a hollow waveguide at the one end portion thereof in conjunction with a fluid coolant dissipation flow channel having a geometrical configuration designed to enhance the fluid coolant flow characteristics.

As set forth in copending application, Serial No. 474,414, filed July 23, 1965, which is assigned to the same assignee as the present invention, a definite need for high frequency, broadband and high power electromagnetic wave energy dissipation water loads, as dummy loads for testing high power generators such as super, and high power klystrons, magnetrons, etc., as well as for measuring the power output of such generators through conventional calorimeter techniques is well established. Furthermore, the need for hollow waveguide waterloads which are cheap and mechanically simple, so to speak, has heretofore not been realized. Prior art coaxial type waterloads have generally been physically long and complex in nature and the present invention obviates both of these disadvantages as will be set forth in detail hereinafter.

In essence the present invention hollow waveguide waterload provides various configurations for fluid coolant flow channels and various means for introducing lossy fluid coolants into said flow channels in conjunction with a broadbanded $n\lambda_g/4$ block window where $n$ is any odd integer disposed in a hollow waveguide and coupled to said flow channels in a manner such that electromagnetic wave energy introduced into said waterload via said hollow waveguide is dissipated in said lossy fluid coolant flowing in said channels. The block window is broadbanded by susceptive iris means disposed upstream from said block window in the hollow waveguide and the block window is disposed in a re-entrant manner within the fluid coolant flow channel in order to enhance cooling of the interface junctions between the hollow waveguide and window to minimize thermal stresses in use while enhancing overall cooling of the window. The fluid coolant flow channel disposed about the window is geometrically tapered in its internal dimensions with minimum cross-sectional dimensions at the downstream face and maximum cross-sectional dimensions at the upstream portion in the vicinity of the block window in a manner such that multiple reflections of electromagnetic wave energy occurs therein in use in order to reduce the fluid volume requirements while simultaneously increasing fluid flow velocity in the window vicinity and maintaining a long path length for the electromagnetic wave in the fluid.

In order to increase the lossy coolant fluid flow velocity and turbulence properties in the block window vicinity, where cooling requirements are greatest, input and output lossy fluid coolant coupling ports are geometrically inter-related relative to the power flow axis of electromagnetic wave energy such that an acute angle is formed between the axis of said fluid coupling ports and the power flow propagation axis in a manner such that lossy fluid coolant introduced into the flow channel sweeps by the downstream window face along a generally curved flow path. Since the waveguide waterload of the present invention is designed to handle high powers of electromagnetic wave energy, such as multi-megawatts peak and multi-kilowatts average the danger of R.F. leakage through fluid couplings, if made of electromagnetic wave permeable material such as rubber etc., is present. Means are provided to eliminate such R.F. leakage fields by functioning as a short circuit for electromagnetic wave energy while simultaneously allowing lossy fluid coolant flow therethrough in use.

As will be shown in detail hereinafter, a wedge shaped geometry having specified apex angles $2\alpha$ of $180°/m$ where $m$ is 2, 3, 4, 5, 6 etc. will eliminate any focusing of reflected electromagnetic wave energy for parallel plane wave trajectories. Thus possible hot spots at extremely high powers are avoided completely when the wedge apex angle falls within the aforementioned limits.

Therefore, an object of the present invention is the provision of a high power, broadband hollow waveguide waterload for high frequency electromagnetic wave energy.

A feature of the present invention is the provision of a hollow waveguide waterload incorporating a $n\lambda_g/4$ thick dielectric block window where $n$ is any odd integer disposed within a hollow waveguide and coupled to a fluid coolant dissipation flow channel having reduced cross-sectional internal dimensions at the downstream end and enlarged cross-sectional internal dimensions at the upstream portion thereof in the vicinity of the block window.

Another feature of the present invention is the provision of a hollow waveguide waterload incorporating a $n\lambda_g/4$ thick dielectric block window where $n$ is any odd integer disposed in a fluid tight manner in a hollow waveguide and coupled to a lossy fluid coolant flow channel having a geometrical configuration which introduces multiple reflections from its internal defining surfaces for electromagnetic wave energy introduced therein through said block window.

Another feature of the present invention is the provision of a hollow waveguide waterload for electromagnetic wave energy which includes a dielectric block window disposed in a hollow waveguide and coupled to a lossy fluid coolant flow channel having fluid coupling ports disposed with their axis oriented at an acute angle with respect to the power flow propagation axis for electromagnetic wave energy of said waterload.

Another feature of the present invention is the provision of a hollow waveguide waterload for electromagnetic wave energy having a dielectric block window disposed within a hollow waveguide and coupled to a lossy fluid coolant dissipation flow channel having a fluid flow pattern past the downstream face of said block window which is generally curved in nature with the radius of curvature located downstream from the block window as measured along the power flow propagation axis for electromagnetic wave energy, in said hollow waveguide.

Another feature of the present invention is the provision of a hollow waveguide waterload for electromagnetic wave energy including a dielectric block window disposed in a hollow waveguide and coupled to a lossy coolant dissipation flow channel having means for introducing and extracting lossy fluid coolant therein, said waveload including means disposed therein which act as a short circuit for electromagnetic wave energy while simultaneously permitting the flow of lossy coolant fluid therethrough.

Another feature of the present invention is the provision of a waveguide waterload including a dielectric block window disposed within a waveguide and coupled to a lossy fluid coolant flow channel having tapered cross sectional internal dimensions, the taper apex being located downstream from the window.

Another feature of the present invention is the provision of a waveguide waterload including a dielectric block window disposed within a waveguide and coupled to a lossy fluid coolant flow channel having a wedge shaped internal geometry, with the apex angle of the wedge having an angular value selected from the following $180°/m$ where $m$ is 2, 3, 4, 5, 6, etc. . . . .

Another feature of the present invention is the provision of a hollow waveguide water load including a dielectric block window disposed within a hollow waveguide with susceptive iris means disposed within said hollow waveguide upstream from said window, said window portion being disposed in a re-entrant manner within a lossy fluid coolant flow channel having tapered cross-sectional internal dimensions and fluid coupling means for introducing lossy coolant fluid therein at an acute angle with respect to the downstream face of said block window.

These and other features and advantages of the present invention will become more apparent upon a perusal of the following specification taken in conjunction with the accompanying drawing wherein.

Figure 1:
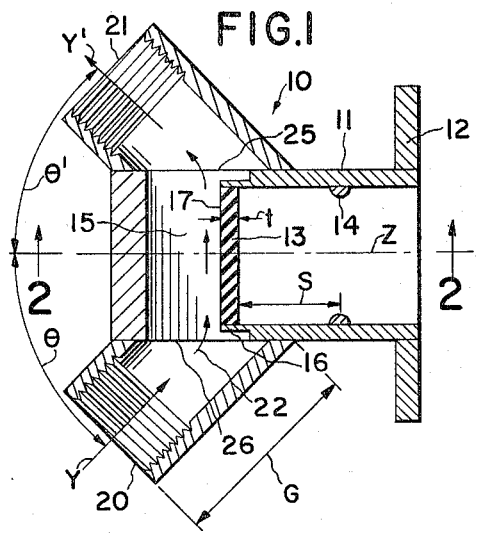
FIG. 1 is a cross-sectional view of a hollow waveguide waterload incorporating the teachings of the present invention.

Referring now to FIG. 1 there is depicted a waveguide waterload 10 embodying the teachings of the present invention. The waterload includes an input hollow waveguide 11 made of OFHC copper or the like having a suitable coupling flange 12 disposed at the input end thereof to facilitate coupling of the waterload to a source of electromagnetic wave energy such as for example a klystron, T-W-T, magnetron, etc. The downstream end portion of the hollow waveguide 11 is terminated by an electromagnetic wave permeable and fluid impervious dielectric block window 13 which is sealed to the internal waveguide walls by any suitable conventional brazing technique to form a good high vacuum seal therebetween. The block window 13 has a thickness dimension $t$ as measured along the Z-axis (power flow axis for electromagnetic wave energy introduced in input waveguide) which is approximately $n\lambda_g/4$ where $n$ is any odd integer although preferably 1 as determined at the center frequency $f_0$ of the passband of the hollow waveguide waterload 10.

The passband of the hollow waveguide waterload is broadbanded by means of preferably inductive iris means 14 disposed within input guide 11 upstream from the window 13 as shown.

The nature of and value of the susceptance as well as its spacing S from the upstream window face of the dielectric block is determined with the lossy coolant fluid in the flow channel using a conventional slotted line for V.S.W.R. measurements and a Smith chart. When a quarter wavelength block window is utilized as taught herein, it can be shown that at $f_0$ a zero reflection coefficient can be theoretically obtained when $$\epsilon_1=\sqrt{\epsilon_0\epsilon_2}$$

where
$\epsilon_0=1$—dielectric constant of air
$\epsilon_1=$dielectric constant of window material
$\epsilon_2=$dielectric constant of lossy coolant fluid assuming no wave-reflection from the lossy medium back through the window. However in practice it is difficult to obtain lossy coolant fluids and window materials having the proper dielectric constants to provide an equality. Hence the additional susceptance is required for this reason alone. Furthermore, the $\lambda_g/4$ window waterload can be broadbanded by the utilization of additional susceptance disregarding the aforementioned problems in obtaining an equality between $\epsilon_1=\sqrt{\epsilon_0\epsilon_2}$. Therefore in order to cancel any residual reflection from the window and broadband the window lumped susceptance is added upstream from the window such that the wave reflection from the susceptance cancels the residual wave reflection from the window.

For example, if we want to use an inductive iris for our susceptance, in order to minimally affect the power handling capabilities of the waterload, we simply, using a slotted line for the V.S.W.R. measurements in conjunction with a Smith chart, in a conventional manner, locate a point down the input guide from the upstream window face distance S, where at $f_0$ the admittance is capacitive. Then we add susceptance in the form of an inductive iris to broadband the waterload.

Conversely, if we want to use a capacitive iris for our susceptance in order to broadband the waterload by canceling residual reflection from the window, we reverse the procedure by locating a point down the guide, upstream from the window face, where the admittance is inductive at $f_0$ and add an appropriate amount of susceptance; in the form of a capacitive iris, to broadband the waterload. Obviously, multiple irises can be used as well and the aforementioned broadbanding mechanism can be generically defined as the introduction of susceptance upstream from the block window such that the wave reflection from the susceptance substantially cancels the residual wave reflection from the window over a band of frequencies centered about $f_0$. Naturally $f_0$ is selected by cutting the window to be $n\lambda_g/4$ thick, as stated previously, at the desired $f_0$.

Waterloads such as depicted herein have been made with 1.15:1 V.S.W.R. over 12% bandwidths with alumina ($Al_2O_3$) window materials having a dielectric constant of around 9 and lossy fluid, like tap water, with a dielectric constant of around 60 at 20° C.

Figure 2:
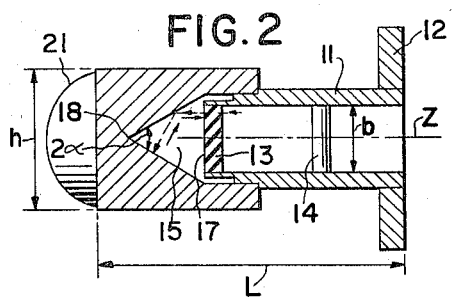
FIG. 2 is a sectional view of the waterload of FIG. 1 taken along the line 2—2 in the direction of the arrows.

The downstream end portion of the input waveguide 11 is disposed in a re-entrant manner within the flow channel 15 in a manner such that lossy fluid coolant passing through the flow channel 15 will come in intimate contact with both the interface junction 16 between the hollow waveguide 11 and block window 13 and with the downstream end face 17 of the block window 13 in order to optimize fluid cooling of these regions and thus minimize thermal stressing thereof. The flow channel 15 is provided with an internal geometrical configuration which is triangular or wedge shaped in nature as seen for example in FIG. 2. The apex edge 18 is disposed in a manner such as to lie in a plane parallel to the broad walls of the rectangular guide 11. The triangular internal configuration of the flow channel 15 provides a number of advantageous characteristics. Since it can be shown that the electromagnetic wave energy introduced into flow channel 15 through window 13 results in maximum heating at the plane of the downstream window face 17 this is the region where high flow velocity and turbulent flow conditions are needed most. If a good lossy fluid such as tap water is directed through the flow channel 15 it is apparent that by using the triangular internal geometry shown in FIGS. 1 and 2 instead of a rectangular waveguide terminating in a transverse plane that the flow velocity can be doubled in the window region without changing the pump requirements such as doubling the speed or volume pumped in relation to a box like internal geometry. Furthermore, the utilization of a wedge or triangular internal geometry as shown in the embodiment of FIGS. 1 and 2 results in multiple reflection patterns for electromagnetic wave energy introduced into the flow channel 15 through the window 13. For example, if the apex angle $2\alpha$ is made 60° as shown in FIG. 2 then the electromagnetic wave energy introduced into the flow channel 15, which can be treated as a simple plane wave front since its wavelength will be a small fraction of the physical dimensions of the flow channel between face 17 and the apex 18 or even the nearest reflecting wall portion such as denoted by the directive arrows, will impinge on the wall portion, be deflected against the opposite wall and then back to its origin as shown. In other words, ordinary optical laws can be applied with respect to the reflection patterns in the flow chamber for electromagnetic energy. This is apparent when one considers that the dielectric constant of the lossy coolant fluid, such as tap water, is approximately 60 at 20° C. while the $\epsilon_0$ of air is 1. This means that for $f_0$ the wavelength in the flow channel 15 will be approximately $\sqrt{60}$ times smaller than in the waveguide 11, assuming a plane wave in both cases for purposes of illustration only.

Lossy coolant fluid such as tap water, water-alcohol, distilled water, etc., is introduced into flow channel 15 by means of input fluid coupling port 20 and extracted therefrom through output fluid coupling port 21. The input fluid flow axis Y is oriented at an acute angle $\theta$ with respect to the power flow propagation axis Z. The output fluid flow axis Y' is similarly oriented at an acute angle $\theta'$ with respect to the power flow propagation axis Z. The angles $\theta$ and $\theta'$ are preferably each 45° and result in a generally curvilinear fluid flow pattern past the window face 17 as indicated by the directive arrows 22 to produce maximum flow velocity and turbulence thereat which in conjunction with the wedge or tapered geometry of the flow channel 15 results in simultaneously maximizing the cross-sectional area of the fluid in the vicinity of the window where it is most needed while minimizing the cross-sectional fluid area at those portions of the flow channel which are removed from the window face thus economizing on fluid pump requirements for a given set of energy dissipation requirements.

Another way of characterizing the fluid flow pattern of the waterload of FIGS. 1 and 2 is the specification that the fluid flow pattern past the downstream window face of the dielectric wave permeable window is generally curvilinear in nature with the radius of curvature disposed downstream from the block window as measured along the electromagnetic power flow propagation axis Z.

Obviously, though $\theta$ and $\theta'$ are shown to be 45° in the preferred embodiment, it is to be understood that curvilinear flow patterns can be achieved with any acute angles. Furthermore, although only a single fluid input coupling port and a single fluid output coupling port are shown, it is to be understood that more than one of each may be utilized without departing from the scope of the present invention.

In order to better comprehend the physical size reductions accompanying the utilization of the teachings of the present invention, average powers of 30 kilowatts at X-band and better can be dissipated using ordinary tap water flowing at around 5 g.p.m. in a waterload such as depicted in FIGS. 1 and 2. A waterload such as shown in FIGS. 1 and 2 using an input waveguide of WR-112, length L 2¼ inches, dimension $h$ only 1¼ inches with simple threaded pipes of Monel or the like having 1 inch outer diameters and 1¾ inches greater length dimensions G brazed to a triangular Monel or the like block forming the flow channel 15 about end apertures 25, 26 as shown with $\theta$ and $\theta'$ at 45°, can dissipate multi-megawatt peak and multi-kilowatt average powers.

Figure 3:
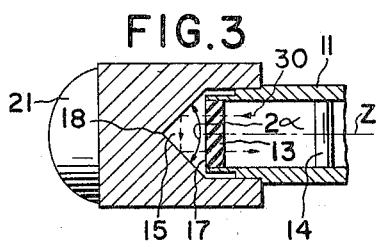
FIG. 3 is a sectional view of the hollow waveguide waterload of the present invention having a 90° apex angle in the fluid coolant flow channel.

In FIG. 3 a simple variation of the apex angle $2\alpha$ of the waterload depicted in the embodiment of FIGS. 1 and 2 is shown. When the apex angle $2\alpha$ is made 90° as shown in FIG. 3 a non-repeating reflection pattern is achieved. In other words the 60° apex angle $2\alpha$ shown in FIG. 2 results in a return of the reflected energy back along its incident trajectory while a 90° apex angle results in a non-repetitive reflection pattern as indicated by the dotted line 30 and accompanying arrows which for 90° results in parallel in and out trajectories as shown.

Figure 10:
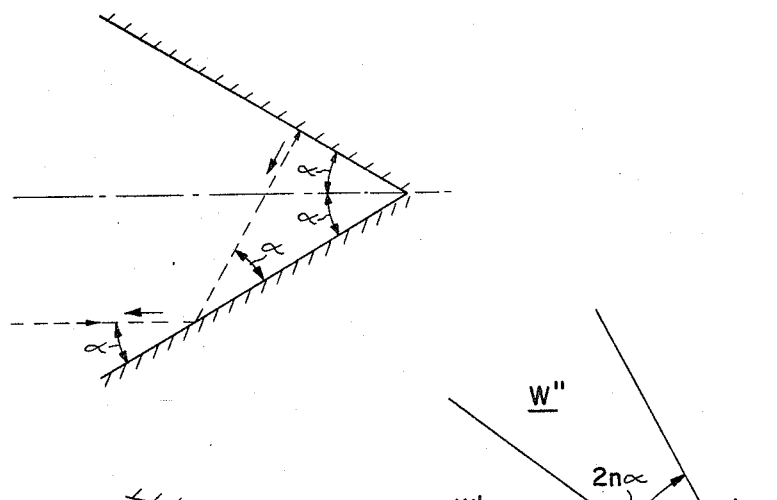
FIG. 10 is a reflecting wedge illustrating certain aspects of the present invention with regard to plane waves.
Figure 11:
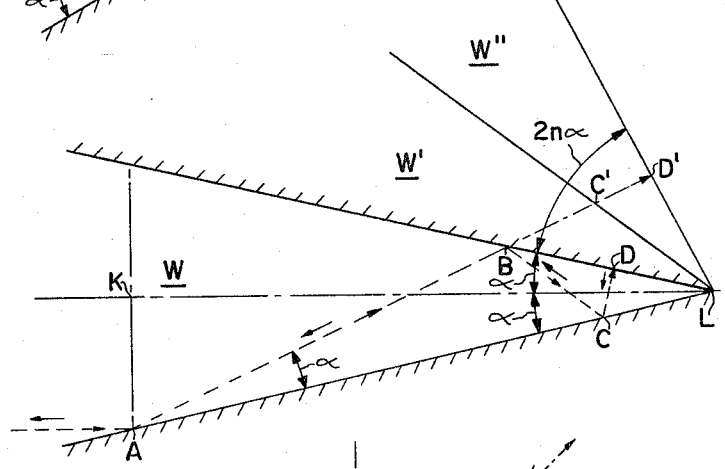
FIG. 11 is another reflecting wedge geometric diagram utilized to illustrate the rationale for wedge angle of $180°/2n+3$ where $n=0$, 1, 2, 3, 4, 5 etc.
Figure 12:
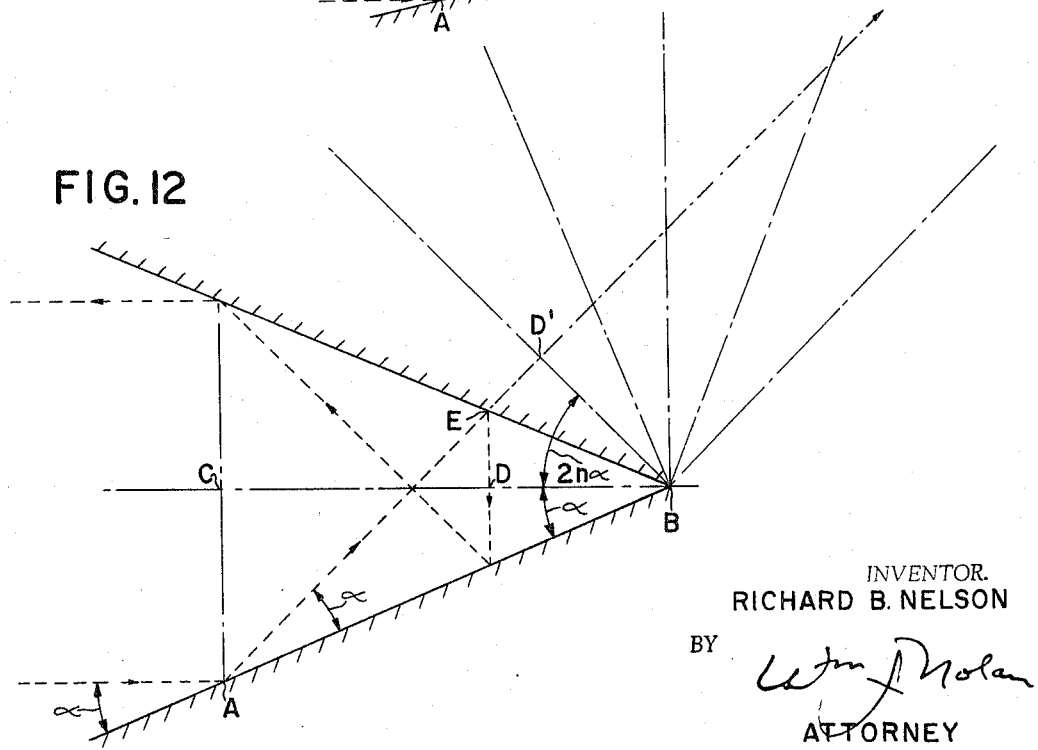
FIG. 12 is another reflecting wedge geometric diagram utilized to illustrate the rationale for a wedge angle of $180°/2n+2$ where $n=0$, 1, 2, 3, 4, 5, etc.

The following analysis, referenced to FIGS. 10–12 indicate those apex angles $2\alpha$ which result in reflection of an incident plane wave as a reflected plane wave without causing focusing of any ray trajectories and consequent hot spots which might prove intolerable at high powers.

Consider a reflecting wedge of half-angle $\alpha$ as shown in FIG. 10. A ray entering the wedge parallel to its central plane of symmetry will be incident on the surface with a complementary angle of incidence $\alpha$. The ray reflected at an equal angle will now make an angle $2\alpha$ with the original direction. Subsequent reflections will each increase the angular deviation by $2\alpha$. Eventually the deviation will exceed 90°, that is the ray will be reflected back out of the wedge. There are certain critical wedge angles for which the total angular deviation is 180°, i.e., the reflected ray leaves parallel to its entrance, as if reflected by a plane mirror perpendicular to the ray.

For these angles the ray at one of its reflections must fulfill one of two conditions. It may be incident perpendicularly on a reflecting surface, in which case it is reflected back retracting its path exactly in reverse. Alternatively, it can cross the plane of symmetry perpendicularly, in which case it is eventually reflected back parallel to its incidence but at an equal distance on the opposite side of the axial plane.

The geometric arrangement of the first case is shown in FIGURE 11. Multiple specular reflections of the ray at A, B, C, D can be equated to passing a straight ray A, B, C', D' through the repeating mirror images of the wedge W', W'', etc. The ray returns on its path when the angle $AD'L = 90°$ (or a similar angle after another number of reflections). This is true when the sum of the other angles in the triangle are 90°, i.e., $\alpha+(2n\alpha+2\alpha)$ where $n=0, 1, 2$ etc., is the number of mirror-imaged wedges the ray goes through.

$$\therefore \alpha \frac{90°}{2n+3}$$

or $$\alpha = \frac{90°}{2m+1}$$

$m=1, 2, 3$ etc. Then the triangles ALK and ALD' are right triangles with the same hypotenuse AL and angle $\alpha$. They are therefore similar and $AD'=KL$. Now $AD'=AB+BC'+C'D'=AB+BC+CD$ by symmetry.

The total path length of the ray from the plane AK back out to this plane is thus twice AD' or twice KL. That is every ray entering parallel travels the same distance as an axial ray KL.

Since every part of the plane wave travels the same distance in the lossy medium, all parts will be attenuated the same amount. The reflected wave will emerge as a plane wave of constant phase and reduced amplitude.

The advantage of this symmetrical arrangement is that there is no focusing of energy to form hot spots. At every point the fields are just the sum of the fields of the plane waves present. For other geometries there could be very high fields at some foci, causing boiling of the liquid or damage to the window.

The alternate geometry of FIGURE 12 is the case where the ray at one of its reflections crosses the symmetry plane of the wedge perpendicularly. By drawing the mirror images of the wedge as before, we see that the requirement is that the angle AD'B be 90°, then $\alpha+(\alpha+2n\alpha)=90°$.

$$\alpha = \frac{90°}{2n+2} = \frac{90°}{2m}$$

where $m=1, 2, 3$, etc.

As before, the half path length $AED=AED'=CB$, so all paths initially parallel to the axis are equal.

The net result is that to achieve these beneficial results the half-angle of the wedge should be any integral submultiple of 90°.

$$\therefore 2\alpha = 180/m$$

where $m=2, 3, 4, 5, 6$, etc.

Figure 4:
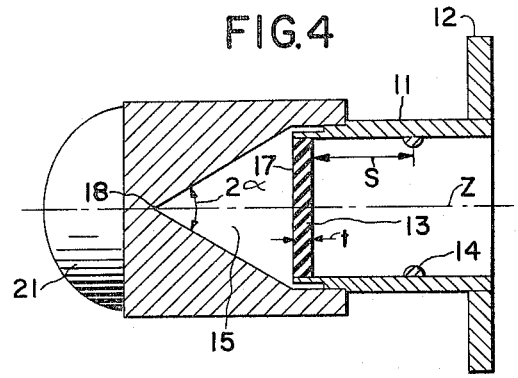
FIG. 4 is a sectional view partly in elevation of a hollow waveguide waterload such as shown in FIG. 1 with the apex edge space rotated through 90° so as to lie in a plane which is parallel to the narrow walls of the waveguide.

In FIG. 4 another variation of the waterload depicted in the embodiment of FIG. 1 is shown. In FIG. 4 the edge of the apex is 90° space rotated so that the apex edge 18 lies in a plane which is parallel to the narrow walls of the rectangular waveguide. This orientation of the apex edge results in increasing the internal volume and cross-section of the flow channel 15 for a given apex angle. Furthermore, the lossy fluid flow path will be past the downstream window face 17 along the narrow window dimensions which results in increased dissipation capacity for a given lossy coolant fluid flow velocity. In other words, by simply space rotating the relative spatial orientations between the apex edge and the narrow and broad wall guide dimensions a plurality of different fluid flow properties are achieved thus increasing the available choice of design criteria. Similarly, by changing the spatial orientation of the inlet and outlet fluid coupling port axes Y, Y' relative to the apex edge 18 the flow characteristics are again controllable to provide the waterload design with additional variable design parameters. In other words, for any given number of flow ports and any given set of $\theta$ and $\theta''$, either equal or unequal, by simply rotating the ports azimuthally about the Z axis, the fluid flow parameters are easily varied to provide the waterload of the instant invention with additional advantages with regard to flexibleness of design parameters which are achieved with a single basic design by simple relative spatial rotation of the various elements thereof.

Figure 5:
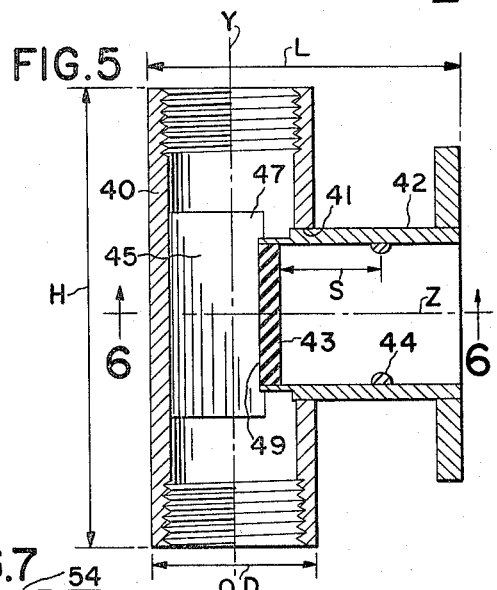
FIG. 5 is a cross-sectional view of a hollow waveguide waterload employing a transversely oriented flow channel with a tapered internal geometry.
Figures 6, 7:
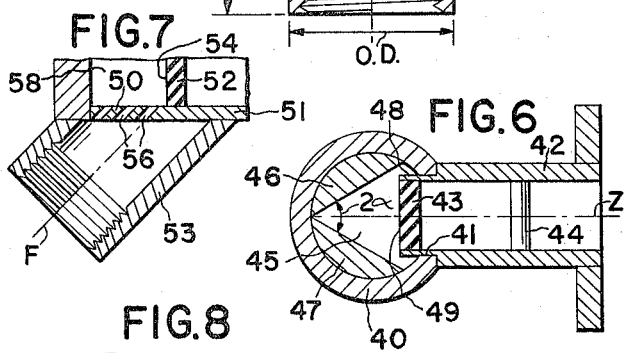
FIG. 6 is a sectional view of the hollow waveguide waterload of FIG. 5 taken along the line 6—6 in the direction of the arrows.
FIG. 7 is a fragmentary cross-sectional view of a hollow waveguide waterload such as depicted in FIG. 1 which incorporates means for preventing electromagnetic energy propagation externally of the flow channel.
Figure 9:
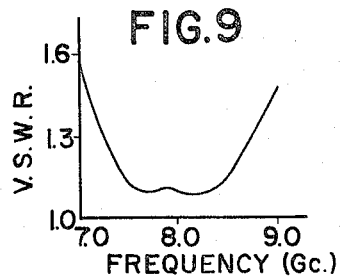
FIG. 9 is an illustrative graphical portrayal of a V.S.W.R. vs. frequency passband characteristic for an X-band hollow waveguide waterload constructed according to the teachings of the present invention.

In FIGS. 5 and 6 a simple hollow flow conduit 40 having internal threads at the input and output ports is provided with an aperture 41 in the central wall portion thereof and the input waveguide 42 sealed therein in a re-entrant manner with block window 43 broad banded by means of inductive iris means 44 as previously discussed. The flow channel 45 is wedge shaped to provide the advantages previously discussed in connection with reduction of pump capacity and increased fluid flow velocity in the vicinity of the window as well as elimination of hot spots due to focusing energy. The wedge shaped internal dimensions for the flow channel 45 can be formed by simple insertion of a pair of chord shaped metal members 46, 47 within a conduit 40 and fixedly securing them by any suitable brazing technique or the like. Obviously, any solid block could be shaped to obtain the desired apex angle $2\alpha$ in lieu of the aforementioned design. The fluid flow pattern for the waterload depicted in FIGS. 5 and 6 results in both good turbulent flow conditions in the interface 48 between the window and the surrounding waveguide walls as well as on the downstream face 49 of block window 43.

A waterload constructed according to the teachings of the present invention as embodied in FIGS. 5 and 6 for X-band operation and easily capable of dissipating 30 kilowatts C.W. with V.S.W.R. ratio of less than 1.1. from 7.5 to 8.5 gc. using ordinary tap water flowing at 5 g.p.m. had the following external dimensions using WR112 waveguide.

| | Inches |
|---|---|
| H | 3.5 |
| L | 2.5 |
| O.D. | 1⅛ |

Again the above dimensions indicate the very compact nature of the hollow waveguide waterload of the present invention. The above design is easily capable of handling multi-megawatt peak and multi-kilowatt average powers. A problem can arise when handling microwave powers of the previously discussed levels when conventional rubber or the like fluid coupling tubes are used to couple the lossy coolant fluid into and out of any of the waterloads depicted in FIGS. 1-6. This problem involves the possible leakage of electromagnetic wave energy of sufficient levels through the rubber couplings and consequent danger to any operating personnel. Furthermore, if the waterloads of the present invention are utilized in a calorimeter set-up any leakage of electromagnetic energy will result in inaccurate measurements.

Figure 8:
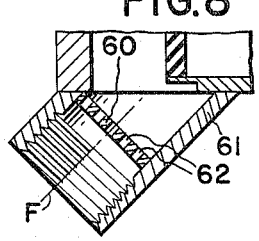
FIG. 8 is a fragmentary cross-sectional view of a hollow waveguide waterload such as depicted in FIG. 1 which incorporates means for preventing electromagnetic energy propagation externally of the flow channel.

In FIGS. 7 and 8 fragmentary portions of a hollow waveguide waterload of the type embodied in FIGS. 1 and 2 is depicted with two variations of means for eliminating leakage problems such as discussed above. In FIG. 7 the electromagnetic wave energy leakage preventing means takes the form of an apertured metal screen like extension 50 of the input guide 51 downstream from the window 52. The fluid coupling port 53 is disposed with its fluid flow axis F disposed at an acute angle with respect to downstream window face 54 or power flow axis of the input guide. In this design the apertures 56 are oriented so as to lie along the fluid flow axis F. In other words the aperture axes 56 are oriented parallel to the flow axis F to permit minimal hinderance to fluid flow while simultaneously maximizing the reflection properties of the screen portion 50 with respect to electromagnetic energy. In other words, the apertures 56 are made large enough to accommodate fluid but small enough relative to the wavelength of the R.F. energy being dissipated in the flow channel 58 such as to act as an electrical short thereto thus preventing leakage therethrough.

In FIG. 8 the R.F. leakage prevention means takes the form of a simple multi-apertured disc 60 disposed within the coupling port 61 as shown. Again the aperture axes 62 are axially aligned with the fluid flow axis F to provide minimal hinderance to fluid flow. The above design is obviously applicable to the waterload embodiment of FIG. 4. It is apparent then that the electromagnetic wave energy leakage preventing means can be characterized as fluid permeable and electromagnetic wave impervious.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A hollow waveguide waterload for dissipating high frequency electromagnetic wave energy including an input hollow waveguide defining an electromagnetic wave energy power flow axis of propagation, said hollow waveguide having an electromagnetic wave permeable and fluid impervious dielectric window disposed therein at the downstream end portion thereof, a fluid coolant dissipation flow channel coupled to said hollow waveguide about the downstream end portion thereof wherein said dielectric window is disposed, said flow channel having a wedge shaped internal geometrical configuration, said flow channel being provided with means for introducing lossy coolant fluid therein and for extracting lossy coolant fluid therefrom, said flow channel being inter-related with respect to said dielectric window such that lossy coolant fluid flowing through said flow channel comes in intimate contact with the downstream face of said dielectric window.

2. The hollow waveguide waterload defined in claim 1 wherein said electromagnetic wave permeable dielectric window is a block window which has a thickness dimension of approximately $n\lambda_g/4$ wherein $\lambda_g$ is determined at the center frequency $f_0$ of the passband of said hollow waveguide waterload and $n$ is any odd integer.

3. The hollow waveguide waterload defined in claim 1 wherein said means for introducing lossy coolant fluid into said flow channel is a fluid coupling port having its fluid flow axis oriented relative to the electromagnetic wave energy power flow axis of propagation of said input hollow waveguide such that an acute angle is formed between the fluid flow axis of said fluid coupling port and said electromagnetic wave energy power flow axis of propogation of said input hollow waveguide as measured downstream from said dielectric window.

4. The waterload defined in claim 1 wherein said wedge shaped flow channel has an apex angle selected from the following angular values:

$$2\alpha = 180°/m$$

where $2\alpha$=apex angle and $m$=2, 3, 4, 5, etc.

5. The hollow waveguide waterload defined in claim 1 wherein said flow channel is provided with fluid permeable and electromagnetic wave impervious means disposed therein which means function as a short circuit for high frequency electromagnetic wave energy within said flow channel while simultaneously allowing lossy coolant fluid to flow through said means through said flow channel.

6. The high frequency waveguide waterload defined in claim 1 wherein said input hollow waveguide is disposed relative to the flow channel such that the dielectric window portion thereof is re-entrantly disposed within said flow channel such that lossy coolant fluid will flow past the downstream face of said window and the interface portions between the window and input waveguide.

7. A waveguide waterload for high frequency electromagnetic wave energy including an input waveguide defining a power flow axis of propagation for electromagnetic wave energy, said input waveguide having an electromagnetic wave permeable and fluid impervious dielectric block window disposed therein in the downstream portion of said input waveguide, a lossy coolant fluid flow channel coupled to said input waveguide about the downstream portion thereof within which said dielectric block window is disposed in a manner such that the downstream face of said block window forms a fluid confining boundary for said flow channel, said flow channel having a generally curvilinear fluid flow axis having its radius of curvature disposed downstream from said dielectric block window.

8. The waveguide waterload defined in claim 7 wherein said flow channel has a generally tapered internal geometry with the largest internal cross-sectional area being in the vicinity of the block window and the smallest internal cross-sectional area being located downstream therefrom as measured along the power flow axis of said input waveguide.

9. A waveguide waterload for high frequency electromagnetic wave energy including an input waveguide for electromagnetic wave energy, said input waveguide having its downstream end portion bounded by an electromagnetic wave permeable dielectric window sealed therein in a manner such said window forms a fluid impervious boundary which boundary is permeable to electromagnetic wave energy, a lossy fluid coolant flow channel disposed about said input waveguide at the downstream portion wherein said dielectric window is disposed, said flow channel having electromagnetic wave energy impervious means disposed therein, said means being permeable to lossy coolant fluid and impermeable to electromagnetic wave energy.

10. The waveguide waterload defined in claim 9 wherein said electromagnetic wave energy impervious means is a conductive metal member having a plurality of apertures therein.

11. A hollow waveguide waterload for dissipating high frequency electromagnetic wave energy, including a hollow rectangular waveguide having an electromagnetic wave permeable and fluid impervious dielectric block window disposed therein, to form a fluid impervious seal across said waveguide, said window being $n\lambda_g/4$ thick where $n$ is any odd integer as determined at the center frequency $f_0$ of the passband of said hollow waveguide waterload, an inductive iris disposed upstream from said block window within said rectangular waveguide, a lossy coolant fluid flow channel coupled to said rectangular waveguide about the downstream portion thereof within which said block window is disposed, said flow channel having an internal geometry which produces non-focusing multiple reflections of electromagnetic wave energy therein.

12. The hollow waveguide defined in claim 11 wherein said flow channel is provided with inlet and outlet fluid coupling ports which are disposed at an acute angle with respect to the downstream window face of said dielectric block window.

13. The hollow waveguide defined in claim 11 wherein said flow channel has a tapered wedge shaped internal geometry.

14. A waveguide waterload for dissipating high frequency electromagnetic wave energy including a waveguide having a dielectric window disposed therein, said dielectric window forming a fluid impervious seal across said waveguide and the said dielectric window being permeable to electromagnetic wave energy, a lossy coolant fluid channel coupled to said waveguide about said portion thereof wherein said dielectric window is disposed, said flow channel having a wedge shaped internal geometry.

15. The waveguide waterload defined in claim 14 wherein said flow channel is provided with input and output fluid coupling ports, said input and output fluid coupling ports having fluid flow axes which are oriented with respect to each other such that the lines of inter-section of said axes form an angle of less than 180°.

16. The waveguide waterload defined in claim 14 wherein the apex angle of the wedge shaped flow channel has an angular value selected from the following relations:

$$2\alpha = 180°/m$$

where $2\alpha$=apex angle and $m$=2, 3, 4, 5, 6, etc.

17. A waterload for high frequency electromagnetic wave energy including an input waveguide for high frequency electromagnetic wave energy, said input waveguide having an electromagnetic wave permeable and fluid impervious dielectric window disposed therein to form a fluid impermeable boundary across the transverse cross-sectional internal dimensions of said input waveguide, said input waveguide being coupled to a lossy fluid coolant dissipation flow channel at the portion thereof wherein said dielectric window is disposed; said flow channel having means for introducing lossy coolant fluid therein along a flow axis which forms an acute angle with respect to the power flow of electromagnetic wave energy propagation axis of said input waveguide.

18. The waterload defined in claim 17 wherein said flow channel has a wedge shaped internal geometry.

19. The waterload defined in claim 17 wherein said dielectric is re-entrantly disposed within said flow channel.

No references cited.

HERMAN KARL SAALBACH, *Primary Examiner.*

R. F. HUNT, *Assistant Examiner.*